United States Patent [19]
McLuckie

[11] B 3,981,148
[45] Sept. 21, 1976

[54] COMBINED FLUID MOTOR AND PUMPING APPARATUS

[75] Inventor: Walter L. McLuckie, Coal City, Ill.

[73] Assignee: Caterpillar Tractor Co., Peoria, Ill.

[22] Filed: Apr. 29, 1974

[21] Appl. No.: 465,145

[44] Published under the second Trial Voluntary Protest Program on January 27, 1976 as document No. B 465,145.

[52] U.S. Cl. .................................................. 60/592
[51] Int. Cl.² ............................................ F15B 7/10
[58] Field of Search ............. 60/592, 547, 535, 533, 60/543; 417/498, 499

[56]     References Cited
         UNITED STATES PATENTS

| | | | |
|---|---|---|---|
| 136,091 | 6/1875 | Overend | 417/498 |
| 2,517,952 | 8/1950 | Welling | 417/498 |
| 2,990,687 | 7/1961 | McCrea | 60/547 |
| 3,199,298 | 9/1965 | Brown | 60/552 |
| 3,407,601 | 10/1968 | Beck | 60/547 X |
| 3,550,379 | 12/1970 | Cox, Jr. | 60/547 |
| 3,635,014 | 1/1972 | Kress | 60/543 |
| 3,768,608 | 10/1973 | Fulmer | 60/547 X |

*Primary Examiner*—Martin P. Schwadron
*Assistant Examiner*—H. Burks, Sr.
*Attorney, Agent, or Firm*—Oscar G. Pence

[57]     ABSTRACT

A combined fluid motor and pumping apparatus including a unitary multi-land piston device having a motor piston end slidably mounted in a motor portion of an elongated tubular housing and an opposite pump piston end slidably mounted in an opposite pumping portion of the housing wherein the working area of the motor piston end is provided with a greater effective working area than the pump piston end so that upon directing a source of fluid at a predetermined pressure against the motor piston end of the piston device the pumping portion is effective to pressurize a work system to a higher pressure than the pressure at the source of fluid with the housing incorporating a fluid reservoir in the motor portion for making up fluid losses in the pumping portion.

7 Claims, 1 Drawing Figure

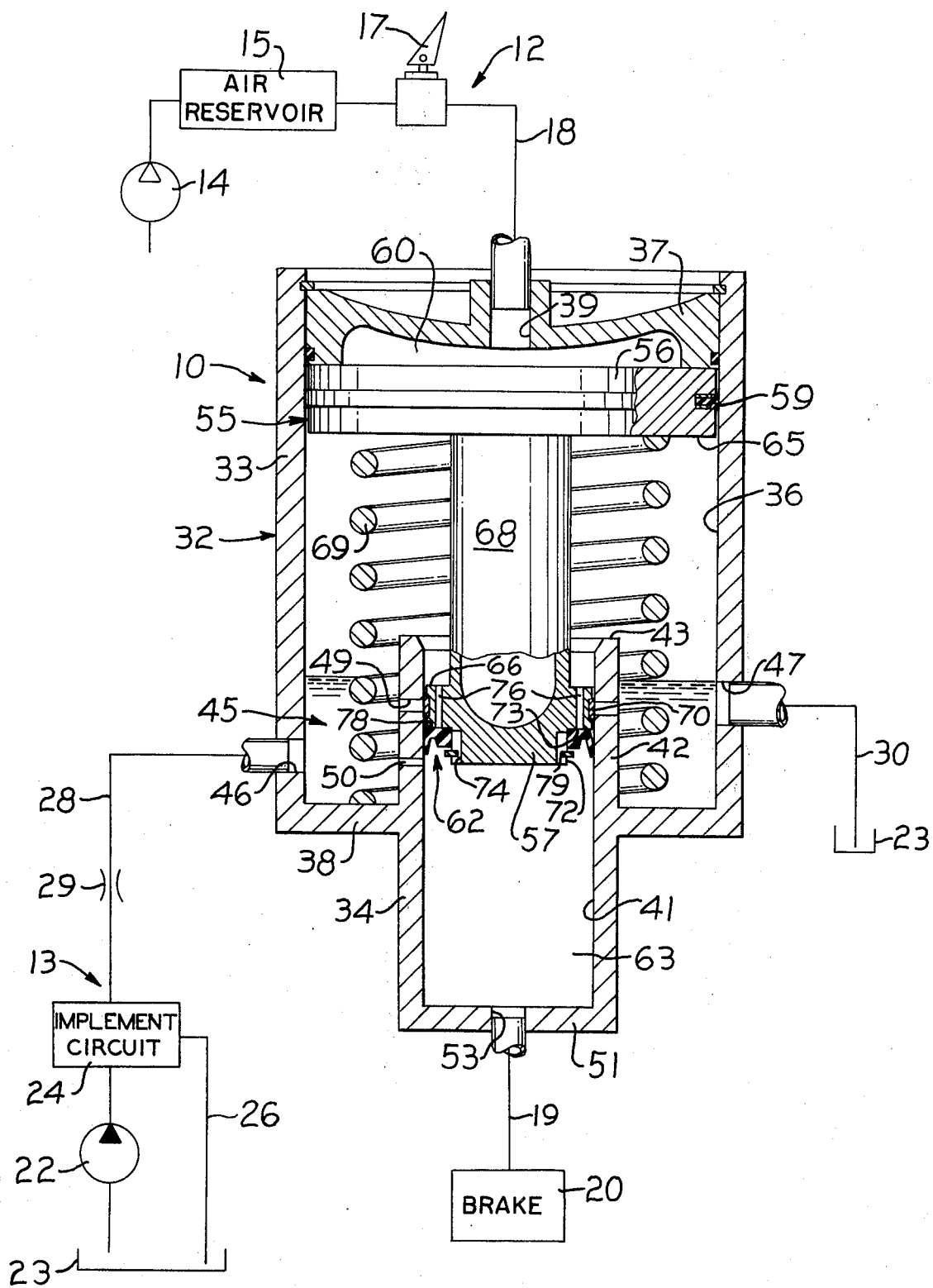

COMBINED FLUID MOTOR AND PUMPING APPARATUS

BACKGROUND OF THE INVENTION

Most large earthmoving vehicles and the like today employ an air-over-oil actuated brake system in order to reduce the amount of operator effort required to apply the wheel brakes of such vehicles. The air assist is commonly accomplished by attaching a separate air actuation chamber at one end of a hydraulic brake master cylinder. In such arrangements, a push rod is used to interconnect the pressure plate of the air chamber with the power piston of the master cylinder so that the energy of the pressurized air is transmitted through the movement of the pressure plate to the power piston by the push rod in order to actuate the master cylinder. However, most of such air chambers utilize a rolling rubber diaphragm for sealing purposes. Such diaphragms are subject to rupture, making the brakes inoperative. Also, such air chambers and their associated master cylinders are extremely complex and contain a relatively large number of components which greatly adds to the overall cost of the brake system.

The relatively small amount of oil necessary to actuate the brakes of smaller vehicles permits the use of a correspondingly small reservoir for supplying makeup oil to the brake system during operation. Such small reservoirs are aptly contained directly in the master cylinder housings of such brake systems without making such housings unduly large and complex. However, in large earthmoving vehicles which frequently utilize large capacity oil cooled, multiple disc-type brakes, a relatively large quantity of oil is necessary to actuate such brakes. Consequently, this requires a correspondingly large reservoir for the makeup oil. Due to space limitations and various other reasons, such large reservoirs and their master cylinders are usually mounted at different locations on the vehicle. Because of the distance the oil must travel between the reservoir and the master cylinder, the response time for replenishing the master cylinder is relatively slow. In an emergency situation, this may result in a delay of the desired application of the brakes and contribute to an already hazardous situation.

OBJECTS OF THE INVENTION

Accordingly, an object of this invention is to provide a combined fluid motor and pumping apparatus for use in an air-over-oil actuated brake system for relatively large vehicles.

Another object of this invention is to provide such a combined fluid motor and pumping apparatus having fewer and more simply constructed components which are longer lived and less susceptible to failure than conventional brake systems.

Another object of this invention is to provide a combined fluid motor and pumping apparatus which eliminates the necessity of providing a separate, relatively large reservoir for supplying makeup oil to the brake system to reduce the delay normally encountered in replenishing such makeup oil when such reservoirs are located a relatively long distance away from their associated master cylinders.

Other objects and advantages of the present invention will be more readily apparent upon reference to the accompanying drawing and following description.

BRIEF DESCRIPTION OF THE DRAWING

The drawing is a vertical cross section of a combined fluid motor and pumping apparatus embodying the principles of the present invention as employed in a schematically illustrated air-over-oil actuated brake system.

DESCRIPTION OF THE PREFERRED EMBODIMENT

Referring more particularly to the drawing, a combined fluid motor and pumping apparatus embodying the principles of the present invention is generally indicated at 10 in association with an air-over-oil brake system 12 and a hydraulic implement system 13 for a large earthmoving vehicle, not shown. The brake system 12 includes an engine driven air compressor 14 which supplies pressurized air to an air reservoir 15. The air reservoir is connected to a brake foot control valve 17. Such foot control valve is connected by a conduit 18 to the combined fluid motor and pumping apparatus 10. A conduit 19 connects the motor and pumping apparatus to a hydraulically actuated brake 20. While any type of hydraulic brake may be utilized, an oil cooled multiple disc-type brake is contemplated because of its large braking and retarding capacity normally necessary for such large earthmoving vehicles.

The hydraulic implement system 13 includes an engine driven hydraulic pump 22 which draws hydraulic oil from a tank 23 for supplying pressurized oil to an implement circuit 24. Such implement circuit may be of any type commonly employed on earthmoving vehicles for operating the jacks employed to power a wide variety of tools on the vehicles. Oil is expelled from the implement circuit through a pair of conduits 26 and 28. Conduit 26 returns such oil directly to the tank, while the conduit 28 interconnects the implement circuit with the combined fluid motor and pumping apparatus 10.

The conduit 28 contains an orifice 29 which is sized relative to the implement circuit back pressure to direct a relatively small flow of oil to the combined fluid motor and pumping apparatus for providing a continuous supply of makeup oil thereto in a manner hereinafter described. A drain conduit 30 is also connected to the apparatus for communicating any excessive oil flow to the tank 23.

It should be noted that while only one combined fluid motor and pumping apparatus 10 has been depicted in the above described hydraulic implement and brake systems for illustrative purposes, it is contemplated that two or more of such apparatus along with two or more brakes or sets of brakes be operatively connected in such systems.

The combined fluid motor and pumping apparatus 10 includes an elongated upright tubular housing 32 having an upper air cylinder or motor portion 33 and a lower oil cylinder or pumping portion 34. The motor portion is provided with a vertically disposed cylinder bore 36 having a predetermined diameter. The opposite upper and lower ends of the motor portion are closed by a detachably mounted cover 37 and an end wall 38, respectively. The cover 37 is provided with a centrally disposed air inlet port 39 which is connected to conduit 18.

The lower pumping portion 34 of the housing includes a cylinder bore 41 coaxial with but having a substantially smaller diameter than bore 36 to permit the extension of a predetermined upper segment 42 of the pumping portion into the motor portion 33. Such upper segment has an open upper end 43 which is elevationally spaced a predetermined distance above the lower end wall 38 of the motor portion. Due to the diametrical difference between the motor and pumping portions, an annular chamber for defining an oil make-up reservoir 45 is formed in the motor portion in surrounding relation to the upper segment of pumping portion.

The conduit 28 is connected to an oil inlet port 46 for admitting the metered flow of oil from the implement circuit 24 into the reservoir 45. Conduit 30 is connected to a drain port 47 which is disposed a predetermined distance above the end wall 38 of the motor portion 33 for maintaining the oil at a predetermined level within the reservoir. A make-up passage 49 is provided in the upper segment of the pumping portion at a position elevationally below the oil level in the reservoir for communicating such oil with the bore 41. A relatively small compensating port at 50 is also provided through the upper segment. The pumping portion 34 also includes a closed lower end 51 having a centrally disposed oil outlet port 53 to which the brake supply conduit 19 is connected.

The fluid motor and pumping apparatus 10 also includes a differential area force intensifying piston device 55 having a relatively large diameter motor piston end 56 and a smaller diameter pump piston end 57. The motor piston end is slidably mounted in bore 36 of the motor portion 33 and is provided with a seal 59 disposed about its periphery in sealing engagement with the bore to define a motor chamber 60 in communication with the air inlet port 39.

The pump piston end 57 of the piston device is slidably mounted in the bore 41 of the pumping portion 34 and includes a lip type seal device 62 in sealing engagement with bore 41 to define a pump chamber 63 in communication with the oil outlet port 53.

The motor and pump piston ends 56 and 57 have opposed axially spaced lower and upper surfaces 65 and 66, respectively. An elongated reduced diameter tie rod 68 extends between such lower and upper surfaces and integrally interconnects the motor and pump piston ends in unitary assembly for force transmitting movement theretogether in predetermined spaced axial relationship. A helical spring 69 is disposed in the motor portion 33 of the housing between the end wall 38 and the lower surface 65 of the motor piston end 56 for normally biasing the piston device 55 upwardly towards the cover 37.

The pump piston end 57 also includes a bearing 70 disposed about its periphery and a reduced diameter lower end portion 72 which defines a radial shoulder 73. The lower end portion is provided with a plurality of axially disposed grooves 74 formed about its periphery and extending adjacent the shoulder 73. A plurality of axially disposed passages 76 extend between the shoulder and the upper surface 66 of pump piston end in radially offsetting relation to the grooves 74.

The seal device 62 is provided with an annular body portion preferably constructed of polytetrafluoroethylene material or the like for slidably mounting the seal device upon the reduced diameter lower end portion 72 of the pump piston end 57. The body portion is provided with a predetermined thickness and a radially disposed face 78 which is positionable in abutting sealing engagement against shoulder 73 for blocking passages 76. A snap ring 79 is secured about the lower end portion 72 at a predetermined axially spaced distance relative to the shoulder 73, which distance is greater than the thickness of the body portion to permit limited axial movement of the seal device away from the shoulder so as to allow communication between the passages 76 and the grooves 74.

OPERATION

While the operation of the present invention is believed to be clearly apparent from the foregoing description, further amplification will subsequently be made in the following brief summary of such operation. Selective actuation of the brake foot control valve 17 is effective in communicating pressurized air from the air reservoir 15 to the motor chamber 60 of the combined air actuated motor and hydraulic pump apparatus 10 through conduit 18 and air inlet port 39. Such air pressure exerts a downward force on the piston device 55 to cause downward movement of the motor and pump piston ends 56 and 57 in their respective bores 36 and 41 against the biasing force of the spring 69. Such downward movement of the pump piston end is effective to pressurize oil contained within the pump chamber 63 once blockage of the compensating port 50 is achieved to transmit pressurized oil through the outlet port 53 and the conduit 19 for actuation of the brake 20. The area differential of the larger motor piston end 56 relative to the smaller pump piston end 57 enables the piston device 55 to produce an oil pressure greater than the air pressure supplied by reservoir 15.

During the above sequence, the oil pressure in the pump chamber 63 is effective to force the face 78 of the seal device 62 against the shoulder 73 of the pump piston end to prevent the escape of oil from the pump chamber through passages 76. It should be noted that any excess oil or air contained within the reservoir 15 is quickly exhausted through the drain port 47 and conduit 30 so as not to resist the downward movement of the piston device.

Upon release of the foot control valve 17, the pressurized air in the motor chamber 60 is exhausted to atmosphere, permitting the upward movement of the piston device 55 under the biasing force of the spring 69. Such upward movement relieves the oil pressure in the pump chamber 63 which permits disengagement of the seal device 62 from the shoulder 73 so that makeup fluid is gravity fed from the reservoir 45 to the pump chamber through makeup passage 49, passages 76 and grooves 74 for replenishing any oil lost therein during the preceding actuation sequence. As the reservoir itself is being continuously resupplied with oil from the implement circuit 24 through conduit 28 and the oil inlet port 46, the usual relatively large separate reservoir of prior art brake systems is not required for supplying makeup oil to the pump chamber 63 during operation.

As is readily apparent, the unitary piston and single housing construction of the present combined air actuated pump and hydraulic motor apparatus 10 has only a relatively small number of components which are of a noncomplex nature to enable a significant reduction in the overall cost of the brake system in which such apparatus is utilized as compared to the more complicated prior art air chambers and master cylinder brake systems. Of primary importance is the elimination of the rubber diaphragm utilized in prior art air chambers, which is subject to rupture. Also, because of the elimination of a large separate reservoir and the compactness of the present apparatus, the overall size thereof is greatly reduced to enable its attachment to the vehicle in a more favorable location without crowding other components.

While the invention has been described and shown with particular reference to the preferred embodiment, it will be apparent that variations might be possible that would fall within the scope of the present invention, which is not intended to be limited except as defined in the following claims.

1. A combined fluid motor and pumping apparatus for pressurizing a closed hydraulic circuit work system upon selective actuation of such apparatus by a source of pressurized air, comprising;

piston means having a pair of axially spaced motor and pump piston ends;

an upright housing providing a predetermined upper motor portion having said motor piston end of said piston means slidably mounted therein and a lower pumping portion having said pump piston end slidably mounted therein, said motor portion being provided with a lower end and said pumping portion being provided with a predetermined upper segment extended into said motor portion and having an open upper end disposed a predetermined distance above said lower end of the motor portion, said upper segment having a size diametrically smaller than said motor portion to define an annular chamber disposed in surrounding relation to said upper segment of the pumping portion for providing an oil makeup reservoir;

means for selectively communicating said reservoir with said pumping portion; and means for automatically replenishing any oil consumed from said reservoir so that the reservoir is continuously maintained with a sufficient amount of oil for recharging said work system as required.

2. The combined fluid motor and pumping apparatus of claim 1 wherein said motor portion of said housing includes a closed upper end having an air inlet port connected to said source of pressurized air and said pumping portion includes a closed lower end disposed elevationally below said lower end of said motor portion and having an oil outlet port connected to said work system so that upon the introduction of pressurized air through said air inlet port into said motor portion against the adjacent motor piston end of said piston means said pump piston end portion is effective to direct pressurized oil from said pumping portion through said oil outlet port to pressurize said work system.

3. The combined fluid motor and pumping apparatus of claim 2 including;

an elongated reduced diameter rod integrally formed between said motor and pump piston ends of said piston means for unitary force transmitting movement of said ends in predetermined spaced axial relation; and a helical spring disposed between the motor piston end of said piston means and the lower end of said motor portion of the housing for normally biasing said piston means upwardly towards said closed upper end of said motor portion.

4. The combined fluid motor and pumping apparatus of claim 3 wherein said means for automatically replenishing any oil consumed from said reservoir includes;

an oil inlet port provided in said motor portion of said housing adjacent said lower end thereof for admitting a continuous supply of oil into said oil makeup reservoir; and drain means disposed a predetermined distance above said lower end of said motor portion so as to provide a predetermined level of oil in said reservoir and to discharge any excess oil therefrom above such level, as well as any excessive fluid pressures.

5. The combined fluid motor and pumping apparatus of claim 4 wherein said pump piston end of said piston means defines a pump chamber in said pumping portion of said housing in communication with said oil outlet port and said means of selectively communicating said reservoir with said pumping portion includes;

first passage means formed through said upper segment of said pumping portion at a position elevationally below said level of oil of said reservoir for directing said oil into said upper segment;

second passage means formed through said pump piston end for directing oil thereabove into said pump chamber; and means for selectively blocking said second passage means during movement of said piston means towards said oil outlet port of said pumping portion to prevent the escape of oil from said pump chamber during pressurization of said work system.

6. The combined fluid motor and pumping apparatus of claim 5 in which said piston end is provided with a reduced diameter lower end portion defining a radially disposed shoulder, and said second passage means includes a plurality of axially disposed grooves formed about the periphery of said lower end portion and a plurality of axially disposed passages disposed in radially offsetting relation to said grooves through said pump piston end.

7. The combined fluid motor and pumping apparatus of claim 6 in which said means for blocking said second passage means includes annular seal means slidably mounted on said reduced diameter end portion of said pump piston end having an outer periphery in sealing engagement with said pump chamber and a radial face disposed in opposed relation to said shoulder, said seal means being adapted for limited axial movement relative to said pump piston end between a first position wherein its face is disposed in abutting sealing engagement against said shoulder for blocking the flow of oil through said axially disposed passages and a second position spaced from said shoulder for permitting communication of said passages with said grooves.

* * * * *